United States Patent
Spliethoff et al.

[11] Patent Number: 5,146,857
[45] Date of Patent: Sep. 15, 1992

[54] PROCESS FOR THE PRODUCTION OF ELECTRICAL ENERGY AND/OR HEATING AND PROCESS HEAT

[75] Inventors: Heinz Spliethoff, Friedrichsthal, Fed. Rep. of Germany; Burkhard Möller, Dresden; Bodo Wolf, Freital, both of German Democratic Rep.

[73] Assignee: Saarberg-Interplan Gesellschaft Für Rohstoff-, Energie- und Ingenieurtechnik mbH, Saarbrucken, Fed. Rep. of Germany

[21] Appl. No.: 536,660
[22] PCT Filed: Oct. 12, 1989
[86] PCT No.: PCT/DE89/00650
 § 371 Date: Mar. 6, 1991
 § 102(e) Date: Mar. 6, 1991
[87] PCT Pub. No.: WO90/04702
 PCT Pub. Date: May 3, 1990

[30] Foreign Application Priority Data
Oct. 18, 1988 [DE] Fed. Rep. of Germany ....... 3835427
Oct. 18, 1988 [DE] Fed. Rep. of Germany ....... 3835428

[51] Int. Cl.[5] ............................................. F23B 7/00
[52] U.S. Cl. .............................. 110/234; 34/10; 34/57 A; 110/224; 110/245; 110/347
[58] Field of Search ............... 110/224, 233, 234, 238, 110/347, 346, 341; 34/10, 57 A

[56] References Cited

U.S. PATENT DOCUMENTS

| | | | |
|---|---|---|---|
| 4,311,103 | 1/1982 | Hirose | 110/238 |
| 4,359,006 | 11/1982 | Have | 110/224 X |
| 4,627,173 | 12/1986 | O'Hagan et al. | 34/10 |
| 4,970,803 | 11/1990 | Keller | 34/10 |
| 4,976,107 | 12/1990 | Korpela | 60/670 |

Primary Examiner—Edward G. Favors
Attorney, Agent, or Firm—James Creighton Wray

[57] ABSTRACT

A partial flue gas stream is used for the production of electrical energy and/or heating and operational heat by utilizing combustion heat from fossil fuels, prior to combustion dried in an indirectly heated fluidized bed dryer, with combustion flue gas used as a carrier medium for the fluidized bed dryer. The mixture of flue gases and steam, deriving from the drying process, is after an intermediate treatment, if necessary, discharged with the main flue gas stream.

16 Claims, 1 Drawing Sheet

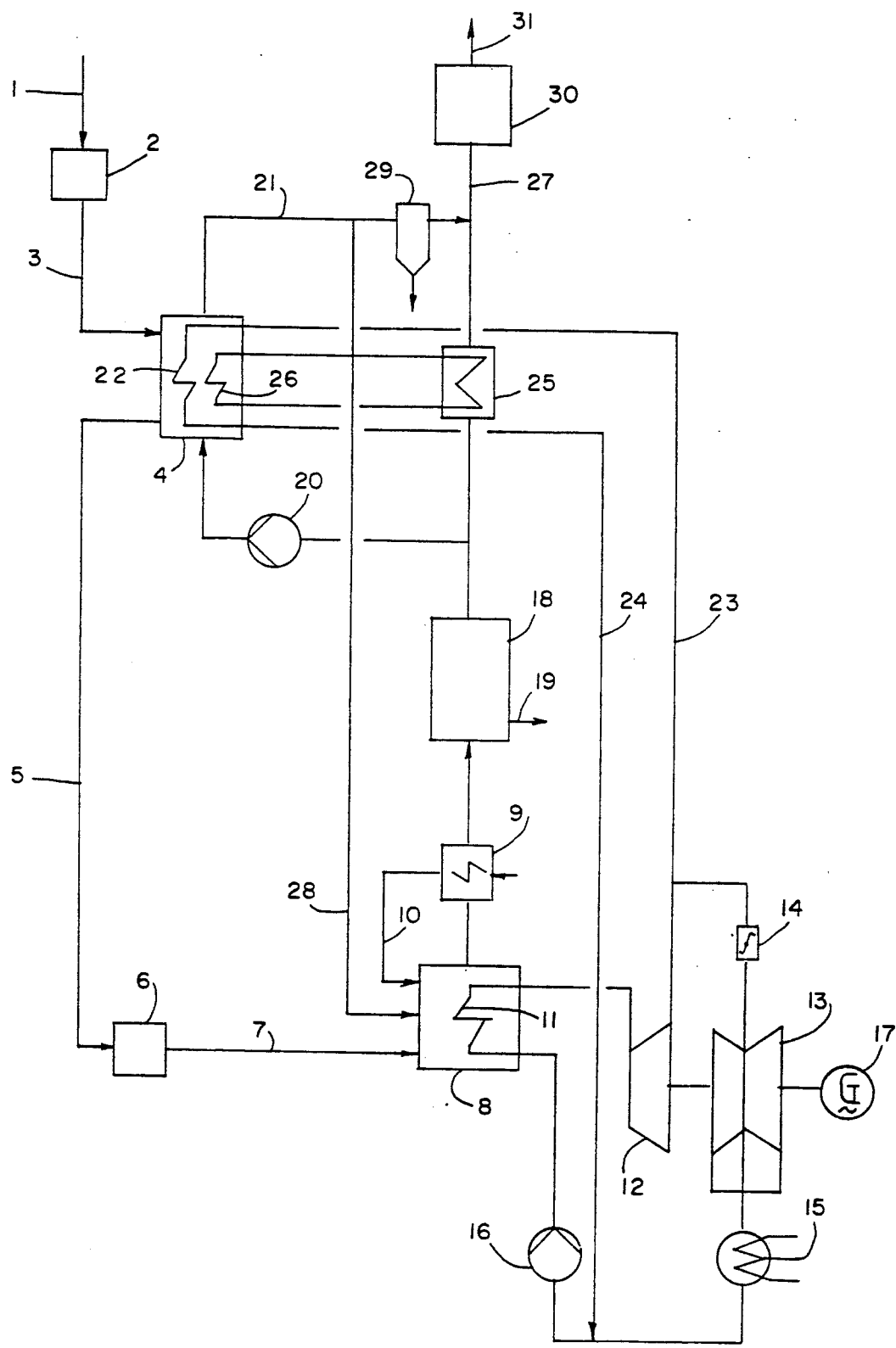

PROCESS FOR THE PRODUCTION OF ELECTRICAL ENERGY AND/OR HEATING AND PROCESS HEAT

BACKGROUND OF THE INVENTION

The invention concerns a procedure for the production of electrical energy and/or heating and operational heat by utilizing combustion heat from fossil fuels, dried in an indirectly heated fluidized bed dryer prior to burning, especially of crude lignite. The resultant flue gases are cooled to an interstage temperature in a heat exchange between the working materials and the combustion air, are freed from dust and, if necessary, are freed from other damaging substances and, subsequently, discharged into the atmosphere.

In power plants in which fossil fuels with a high content of moisture are used as, for example, crude brown coal with a water content of 50% or more, a considerable portion, up to 25% of the utilized fuel, must be used for the vaporization of the water which then, as steam together with the flue gas, leaves the power plant. According to that method, the heat required for the vaporization demands an unnecessarily high temperature level.

To improve the level of effectiveness of such power plants, drying the fuel prior to its combustion has already been suggested in indirectly heated fluidized bed dryers utilizing the vapor stream deriving from the drying process as a support medium for the fluidized bed. The disadvantage of such a procedure is that, based on the pure steam atmosphere in the dryer, i.e. of the high partial pressure of the steam, the heat required for the drying process must be produced at a relatively high temperature level. Besides, an additional expenditure in equipment is necessary, for example, for special parts such as a vapor cleaning device, evaporator, condenser and preparer for the vapor condensation which, even in a close inclusion into the generator process, cannot be reduced essentially.

SUMMARY OF THE INVENTION

The invention has the object of further developing a process of the above-mentioned type in such a manner that, without considerably limiting the availability of the power plant process, the predrying of the utilized fuel can be accomplished with the lowest possible energy and equipment expenditure.

The object, based on this invention, is solved in that a partial flue gas stream is used as a carrier medium for the fluidized bed dryer, and that the mixture of fumes and steam, obtained during the drying process after an intermediate treatment, can be removed with the main flue gas stream.

The proposal based on this invention renders the energetically favorable integration of the drying of fuel in the existing power plant possible, without a considerable additional expenditure. In using a partial flue gas stream as a support medium for the fluidized bed of the dryer, the residual heat, normally removed as waste heat, can be utilized in a simple manner for the drying process. Furthermore, the mixing of the vapors developing in the dryer with the flue gas effects a considerable partial reduction of the steam pressure, so that the drying heat can be made available at a relatively low temperature level. For example, a low temperature residual bleeder steam from the water-steam circulation process of the power plant can be reused. To control the respective temperature level in the dryer, the pressure of the steam used as a heating medium can be adjusted, for example, through integration of a counterpressure turbine into the water-steam circulation process of the power plant or an adjustable condensation extraction turbine.

It is of advantage if at least a part of the mixture of flue gas and steam developing in the dryer is returned to the furnace for the fossil fuels, without first removing the dust. Thereby the necessary dust removal of this gas stream is eliminated and, on the other hand, the energy content of the fuel particles carried along can, in a simple manner, be utilized in the power plant process.

The gas amount introduced from the fluidized bed dryer into the furnace depends on the type of fuel used, as well as on the respective load condition of the power plant process. Thereby it can be expected that, during the utilization of the usual smelting chamber dust or dry dust burning, a larger gas amount can be returned than in a static and circulating fluidized bed firing operated at a lower combustion chamber temperature level. The residual mixture of flue gas and steam, for technical reasons not returned to the furnace, is rendered dust free and is directly introduced into the main flue gas stream of the power plant prior to flue gas removal. If necessary, the whole flue gas-steam mixture can be rendered dust free and introduced into the main flue gas stream.

The working process of the power plant is not impaired by the proposed manner of fuel drying, since the main gas passages are available as before, with the usual plant components, and are not influenced by the proposed drying process for the fuel.

BRIEF DESCRIPTION OF THE DRAWING

The drawing is a schematic representation of a power plant and a fuel dryer process of the present invention.

DETAILED DESCRIPTION OF THE DRAWING

The invention concerns, firstly, the drying of lignite intended as fuel for a power plant. Of course, the invention can also be used for other fossil fuels with a high water content.

An additional understanding of the invention can be had with reference to the specification and to the schematic drawing.

According to the power plant process schematically shown in the drawing, lignite with a water content of up to 50% and more is conducted over a line 1, first to a breaker or a mill 2, and then over a line 3 into a fluidized bed dryer 4, and dried therein until 20% residual water content remains. The dried lignite is removed over a line 5 and, if necessary, is crushed in a second coal mill 6 onto a grained belt and is pulverized as required for the burning, and is transferred over line 7 into a power plant boiler 8, and then is burned. The required combustion air is preheated in the heat exchange with hot flue gases in a heat exchanger 9 and is guided through line 10 into the boiler. The combustion heat developed in boiler 8 is transferred over heating surfaces 11 to the water-steam circuit of the power plant, with turbine stages 12 and 13, a condenser 15, a feed water pump 16, and a generator 17.

The flue gases leaving the power plant boiler 8 are then cooled in heat exchanger 9 to a temperature of between 130° C. and 150° C., and then rendered dust free in an electrofilter 18, with an dust outlet 19.

A partial stream of the cleaned flue gases is, based on this invention, guided with a blower 20 as support gas for the fluidized bed to the fluidized bed dryer 4. The amount of the partial flue gas stream is thereby adjusted and set exclusively for the requirements of the fluidized bed dryer 4 by means of the blower 20, so that the lowest load level of the flue gas in the power plant is still adequate for the operation of the fluidized bed dryer. In this manner, the fluidized bed dryer can be operated independently from the respective load range of the power plant block.

The partial flue gas stream cools within the fluidized bed in a direct heat exchange with the lignite to be dried to the bed temperature of about 60° C. and, together with the accumulated accompanying matter from the dryer 4, leaves over a line 21. Since the mixture of flue gases and material inevitably carries along combustible particles from the fluidized bed of the dryer, the partial stream is guided over a line 28 immediately for fueling the boiler 8. The volume of this partial stream is thereby dependent on control signals of the boiler output and boiler operation. The remaining stream of the mixture of flue gas and vapors is rendered dust free in a cyclone cleaner or entrained material filter 29 and then is introduced into the line 27 of the main flue gas stream. In a schematically shown part 30 of the plant, the flue gas is freed from damaging substances, such as $SO_2$ and perhaps $NO_x$, and is transferred over a line 31 to facilities not shown here for discharge into the atmosphere.

About 5-10% of the drying heat is conducted to the dryer 2 over the partial stream of flue gas. The remaining 90-95% is supplied through heat exchanger system 22. Furthermore, considerable exhausted bleeder steam is extracted from the turbine stage 12 over a line 23, is condensed in the heat exchanger system 22, and is reintroduced into the steam-water circulation system of the power plant over a line 24. The portion of steam remaining from the turbine stage 12 is conducted through a valve to the second turbine stage 13. Thereby, the steam pressure withdrawn over line 23 can be controlled by valve 14. The utilization of flue gas as the support medium for the fluidized bed brings about in the dryer a lowering of the partial steam pressure up to 0.5 bar. This partial pressure lowering results in the considerable advantage that, in reference to the steam, the drying is carried out practically in a "vacuum" which means, at very low temperatures, and that the turbine withdrawal steam, used as a heating medium, can be withdrawn near the cold end of the turbine, with relatively low effects on the turbine performance.

In a further variant of the process shown in the diagram, it is easily possible to introduce residual heat of the main flue gas stream over an intermediate heat carrier circulation system to the drying process. Furthermore, the flue gas stream is cooled in heat exchanger 25 against a suitable heat carrier which then, in another heat exchanger 26 arranged in the fluidized bed of the dryer 4, discharges the accepted heat into the matter to be dried.

While the invention has been described with reference to specific embodiments, modifications and variations of the invention may be constructed without departing from the scope of the invention, which is described in the following claims.

We claim:

1. A process for the production of electrical energy and/or heating and operational heat by utilization of the combustion heat from fossil fuels, especially lignite comprising drying the fossil fuels prior to the combustion in an indirectly heated fluidized bed dryer, cooling the flue gases derived from combustion in a heat exchange with combustion air to an intermediate temperature level, freeing the flue gases from dust and other damaging substances, and discharging into the atmosphere, wherein a partial flue gas stream, already rendered dust free, is used as a support medium for the fluidized bed dryer, and a mixture of flue gas and steam developed during the drying process, after an intermediate treatment, is discharged together with the main flue gas stream.

2. The process of claim 1, characterized in that at least one part of the flue gas and steam mixture is introduced in for combustion without being rendered dust free.

3. The process of claim 1, characterized in that at least one part of the flue gas and steam mixture is rendered dust free and is introduced directly into the main flue gas stream.

4. The process of claim 1, characterized in that the partial flue gas stream used as the support medium is controlled and adjusted depending on the need for the fluidized bed dryer.

5. The process claim 1, characterized in that indirect heating of the fluidized bed dryer is, at least in part, carried out by means of low temperature steam.

6. The process of claim 5, characterized in that the pressure of the steam used for the indirect heating of the fluidized bed dryer is adjustable.

7. The process of claim 5, characterized in that expanded steam from a counter-pressure turbine in the power plant process is used for the indirect heating of the fluidized bed dryer.

8. The process of claim 5, characterized in that slack steam taken from a condensation turbine or a discharge condensation turbine is used primarily for the indirect heating of the fluidized bed dryer.

9. The process of claim 7, characterized in that the steam pressure at a discharge point is adjusted or controlled by a switching device, for example a throttle valve in the remaining steam flow.

10. The process of claim 1, characterized in that the heat from the remaining main flue gas stream is supplied to the fluidized bed dryer through an intermediate heat carrier circulation.

11. The process of claim 2, characterized in that at least one part of the flue gas and steam mixture is rendered dust free and is introduced directly into the main flue gas stream.

12. The process of claim 3, characterized in that the partial flue gas stream used as the support medium is controlled and adjusted depending on the need for the fluidized bed dryer.

13. The process of claim 4, characterized in that indirect heating of the fluidized bed dryer is, at least in part, carried out by means of low temperature steam.

14. The process of claim 6, characterized in that expanded steam from a counter-pressure turbine in the power plant process is used for the indirect heating of the fluidized bed dryer.

15. The process of claim 6, characterized in that slack steam taken from a condensation turbine or a discharge condensation turbine is used primarily for the indirect heating of the fluidized bed dryer.

16. The process of claim 9, characterized in that the heat from the remaining main flue gas stream is supplied to the fluidized bed dryer through an intermediate heat carrier circulation.

* * * * *